(12) United States Patent
Halim et al.

(10) Patent No.: US 12,399,749 B2
(45) Date of Patent: Aug. 26, 2025

(54) NEURAL PATHS FOR WORKLOAD EXECUTION

(71) Applicant: HEWLETT-PACKARD DEVELOPMENT COMPANY, L.P., Spring, TX (US)

(72) Inventors: Irwin Halim, Spring, TX (US); Trey Elliott, Spring, TX (US); Thomas Flynn, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 594 days.

(21) Appl. No.: 17/801,203

(22) PCT Filed: Feb. 19, 2020

(86) PCT No.: PCT/US2020/018901
§ 371 (c)(1),
(2) Date: Aug. 19, 2022

(87) PCT Pub. No.: WO2021/167607
PCT Pub. Date: Aug. 26, 2021

(65) Prior Publication Data
US 2023/0075828 A1    Mar. 9, 2023

(51) Int. Cl.
*G06F 9/50* (2006.01)
(52) U.S. Cl.
CPC .................................. *G06F 9/505* (2013.01)
(58) Field of Classification Search
None
See application file for complete search history.

(56) References Cited

U.S. PATENT DOCUMENTS

| | | | |
|---|---|---|---|
| 9,081,627 B1 * | 7/2015 | Blanding | G06F 9/5061 |
| 10,360,214 B2 | 7/2019 | Gold et al. | |
| 10,412,155 B2 | 9/2019 | Kumar et al. | |
| 10,452,441 B1 * | 10/2019 | Subramanian | G06N 20/20 |
| 10,540,202 B1 * | 1/2020 | Smaldone | G06F 9/5027 |
| 2014/0047095 A1 * | 2/2014 | Breternitz | G06F 9/5072 |
| | | | 709/224 |
| 2014/0047341 A1 * | 2/2014 | Breternitz | G06F 9/5072 |
| | | | 715/735 |
| 2014/0180738 A1 * | 6/2014 | Phillipps | G06N 20/10 |
| | | | 705/7.38 |
| 2018/0276044 A1 * | 9/2018 | Fong | G06F 9/4881 |
| 2019/0042328 A1 * | 2/2019 | Ortega | G06F 9/5055 |
| 2019/0199602 A1 * | 6/2019 | Zhang | H04L 41/40 |
| 2019/0303211 A1 * | 10/2019 | Dias | H04L 47/2425 |

(Continued)

FOREIGN PATENT DOCUMENTS

| | | |
|---|---|---|
| CN | 109213600 A | 1/2019 |
| CN | 109710383 A | 5/2019 |

(Continued)

*Primary Examiner* — Adam Lee
(74) *Attorney, Agent, or Firm* — Quarles & Brady LLP (57) ABSTRACT

In one example, a neural network model may be generated for a computing network having a plurality of computing resources. Performance metrics and historical usage patterns are the basis for learning current utilization patterns of the computing resources. A workload capacity for each one of the computing resources may be determined, and a neural path may be generated for execution of a specified workload.

20 Claims, 4 Drawing Sheets (56) References Cited

U.S. PATENT DOCUMENTS

| | | |
|---|---|---|
| 2019/0317740 A1 | 10/2019 | Herr et al. |
| 2019/0324805 A1* | 10/2019 | Peng ..................... G06F 9/5005 |
| 2019/0349426 A1* | 11/2019 | Smith ................... H04L 9/3239 |
| 2019/0361626 A1 | 11/2019 | East |
| 2020/0026577 A1* | 1/2020 | Dias ........................ G06F 18/23 |
| 2020/0028935 A1 | 1/2020 | Sahay et al. |
| 2020/0044938 A1* | 2/2020 | Dias ........................ H04L 67/34 |
| 2020/0225990 A1* | 7/2020 | Vaddi ...................... G06F 9/455 |
| 2021/0028991 A1* | 1/2021 | Nataraj ................... H04L 41/40 |
| 2023/0012487 A1* | 1/2023 | Makaya ................ G06F 9/5027 |

FOREIGN PATENT DOCUMENTS

| | | |
|---|---|---|
| KR | 10-2019-0028210 A | 3/2019 |
| WO | 2014/143802 A1 | 9/2014 |
| WO | 2016/176414 A1 | 11/2016 |

\* cited by examiner

NEURAL PATHS FOR WORKLOAD EXECUTION

BACKGROUND

Many organizations have multiple computing resources. For example, an organization may have a computing system for each member of the organization. Such computing systems can facilitate the execution of multiple workloads by member computing systems. Each member organization can utilize its own computing resource for workload execution. Workload capacity of the network's computing resources may be in MIPS (millions of instructions per second). MIPS may generally indicate the number of machine instructions that a computing resource can execute in one second although different instructions require more or less time than others.

BRIEF DESCRIPTION OF THE DRAWINGS

Examples of the disclosure will be rendered by reference to specific examples thereof which are illustrated in the appended drawings. The drawings illustrate only particular examples of the disclosure and therefore are not to be considered to be limiting of its scope. The principles herein are described and explained with additional specificity and detail through the use of the accompanying drawings in which.

DETAILED DESCRIPTION

As noted above, organizations may have multiple computing resources to facilitate execution of workloads by each member. However, although many such computing resources are utilized during business hours, they remain idle or in sleep mode during off-peak or non-business hours. This non-usage can be said to represent a 66% reduction in available computing capacity. Even worse, the computing resources continue to consume power during periods of non-use. Computing resources may also be underutilized because it is difficult to ascertain whether a host user of the computing resource is using the computing resource at full capacity. Thus, in some instances, in order to execute a desired workload, an organization may incur the cost of additional computing resources or data transformation while having idle computing resources. In addition, during big data ingestion, or the ETL (extract, transform, load) process, a large number of virtual machines may run to copy data from one computing resource to another. During this copy process, the data structure may be changed to meet data store demand.

Accordingly, examples of the present disclosure utilize a neural network model to facilitate execution of workloads by a network of computing systems. In some examples of the present disclosure, a network of computing systems may be used to execute a workload. A neural network model may include a number of computing systems interconnected so that data may be propagated to every computing system of the network. The network may learn by repeatedly evaluating data, generating predictions based upon the evaluations, and adjusting outcomes based upon the accuracy of the predictions.

In one example, the network may learn through training by comparing predictions to known outcomes. As training progresses, the predictions of the neural network model may become increasingly accurate. For example, the computing systems of a network may have a neural network model that learns current utilization patterns of each computing system to determine a workload capacity. The neural network model may then generate a neural path for execution of a specified workload. A neural path is a path through the network that may provide the capacity to meet the execution cost for a workload. The path is considered a neural path because it is continually revised based upon the neural network learning through a process of trial and error.

For some examples, the neural path may be dynamically updated upon changes to the workload capacity of any of the computing systems. For some examples, the estimated execution cost for a specified workload may be determined by simulated workload executions or by reference to past workload executions.

In one example, computing systems of a network may have a neural network model that learns current utilization patterns of each computing system to determine a workload capacity. The neural network model may then generate a neural path for execution of a specified workload. In this manner, the path to and the work capacity of an underutilized computing resource is identified for a specified work capacity. Organizations need not procure additional computing resources as they can utilize existing computing resources that would otherwise remain idle.

In one example of the present disclosure, the neural path may be dynamically updated based upon changes to the workload capacity of any of the computing systems. In one example, the estimated capacity for a specified workload may be determined by simulated workload executions or by reference to past workload executions.

In one example, the neural network model calculates system utilization of each computing system by measuring performance related metrics that may include CPU utilization, RAM utilization, disk I/O activity and network activity. As the workload is executed, additional utilization information for each computing system may be obtained and used to revise a neural path for execution of a workload and to more accurately predict workload capacity.

The neural network model may, over time and after multiple executions, learn the patterns of computing resource availability to increase accuracy of predicted workload capacity. As more data is analyzed, the neural network model may become more accurate and efficient. Accurate predictions may allow workloads to be executed across multiple computing systems with less impact on the primary users of the computing systems.

For some examples, workloads may be containerized to allow execution across many disparate computing systems. Containerization may provide separation and security of the primary users' data.

Figure 1A:
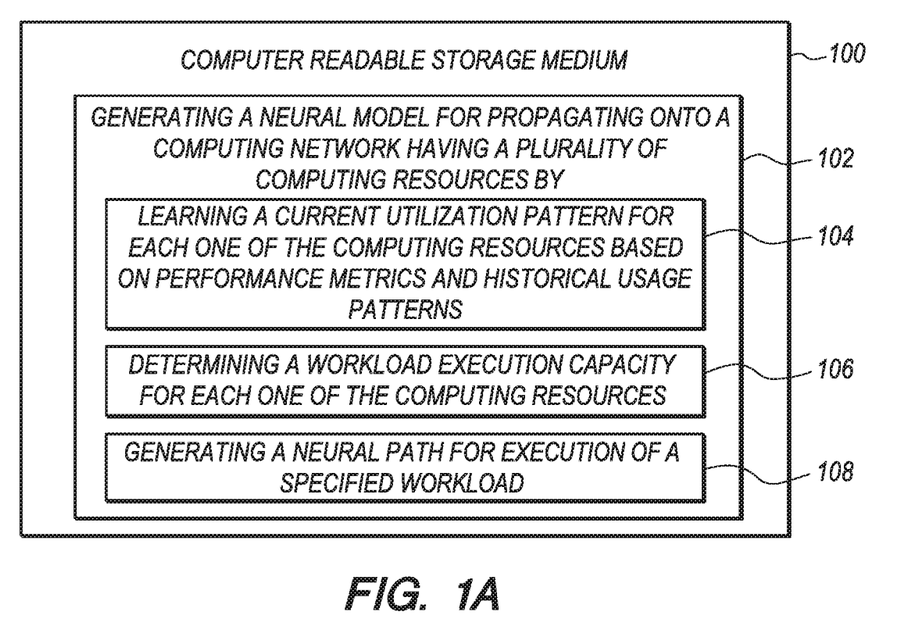
FIG. 1A illustrates example instructions stored on an example non-transitory computer-readable storage medium to implement artificial intelligence-based distributed workload execution according to the present disclosure.
Figure 1B:
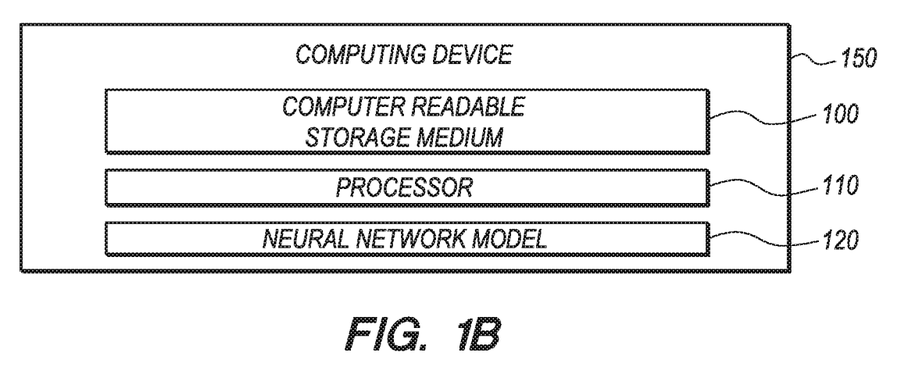
FIG. 1B illustrates an example computing device according to the present disclosure.

FIG. 1A illustrates example instructions stored on a non-transitory computer-readable storage medium 100 to implement artificial intelligence-based distributed workload execution according to the present disclosure, and FIG. 1B illustrates an example computing device 150 according to the present disclosure.

Figure 3:
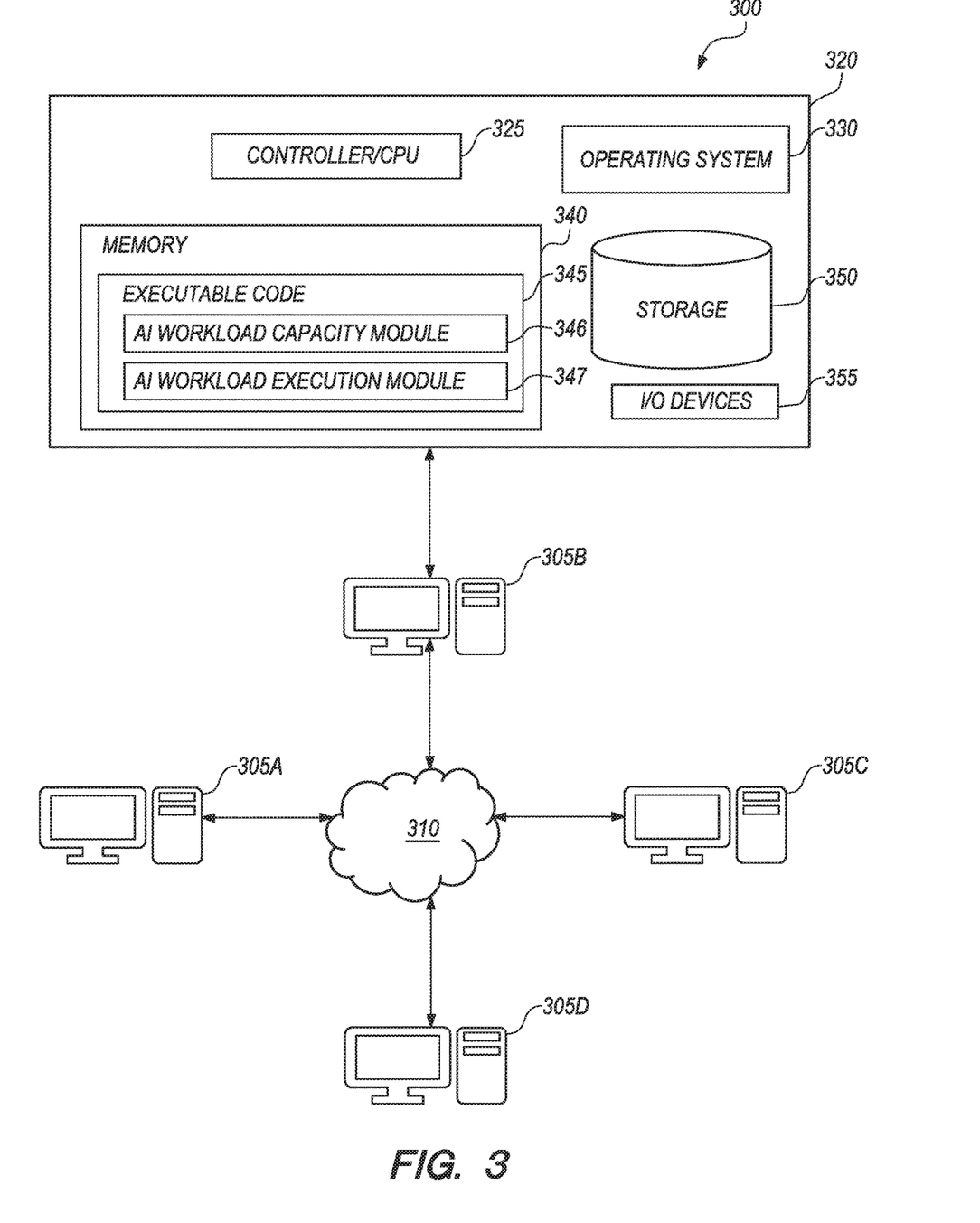
FIG. 3 illustrates an example network of computing systems to implement artificial intelligence-based distributed workload execution according to some examples of the present disclosure.

As shown in FIG. 1A, the non-transitory computer-readable storage medium 100 includes instruction 102 that may cause a processor 110 (FIG. 1B) to generate a neural network model 120 (FIG. 1B) to propagate onto a computing network 300 (FIG. 3) having a plurality of computing systems 305a-305d (FIG. 3). The neural network model 120 may make predictions of computer resource utilization to generate a neural path for the execution of workload across multiple computer resources. These predictions may have greater accuracy as more data is analyzed.

Instruction 102 may include instruction 104, instruction 106 and instruction 108. Instruction 104 may cause a processor to perform the operation of learning a current utilization pattern for each one of the computing resources based on performance metrics and historical usage patterns. Such performance metrics may include CPU utilization, RAM utilization, disk I/O activity and network performance (i.e., bandwidth or data transfer rate over the network).

Instruction 106 may cause processor 110 to perform the operation of determining a workload capacity for each one of the computing systems 305a-305d. (FIG. 3). The performance metrics and historical usage patterns provide an initial estimate of the workload capacity for each one of the computing systems 305a-305d. System utilization patterns may be monitored, and real-time updates may allow the neural network model 120 (FIG. 1B) to learn system utilization and refine workload capacity estimates for each one of the computing resources of the network.

Instruction 108 may cause the processor 110 to perform the operation of generating a neural path for execution of a specified workload. The workload execution cost for a specified workload may be determined. The workload execution cost is an estimation of the computing system resources that may be used to execute the workload. The workload execution cost may include the time for executing the workload. To obtain an accurate estimate of the workload execution cost of a specified workload, the neural network model 120 may use the performance metrics of the computing systems and workload execution time. The neural network model 120 may use the performance metrics and workload execution time together to determine which systems are capable of executing the workload and the amount of time for such systems to execute the workload. The workload execution cost for a specified workload may be estimated by simulating a workload. Furthermore, the workload execution cost for a specified workload may be estimated by executing the actual workload and analyzing system performance metrics and workload execution time.

The non-transitory computer-readable storage medium 100 may be any electronic, magnetic, optical, or other physical storage device that stores executable instructions. For example, the non-transitory computer-readable storage medium 100 may be a random access memory (RAM), an electrically-erasable programmable read-only memory (EEPROM), a storage drive, an optical disc, or the like. The non-transitory computer-readable storage medium 100 can be encoded to store executable instructions that cause the processor 110 to perform operations according to examples of the disclosure.

Figure 2:
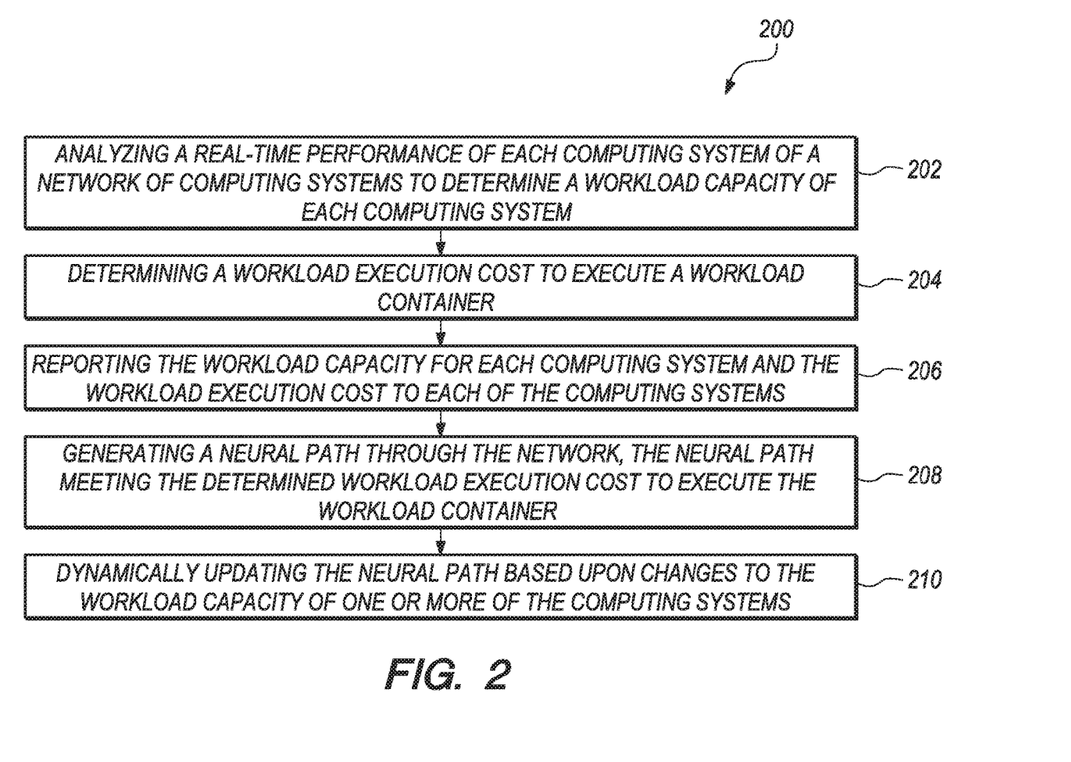
FIG. 2 illustrates an example artificial intelligence-based workload execution process according to some examples of the present disclosure.

FIG. 2 illustrates a process according to some examples of the present disclosure. Process 200, illustrated in FIG. 2 may be representative of computer readable instructions that may be executed by a processor to implement a process for workload execution.

Process 200 begins with operation 202 at which the real-time performance of each computing system of a network of computing systems may be analyzed to determine a workload capacity for each computing system. Analyzing the real-time performance of each computing system may include analyzing CPU utilization, RAM utilization, disk I/O speed, instruction execution speed, network bandwidth and floating-point operation speed. Analyzing the real-time performance of each computing system may include analyzing the availability of the computing system.

At operation 204, a workload execution cost to execute a workload container may be determined. As described above in reference to FIG. 1, a workload execution cost for a specified workload may be determined by measuring the performance metrics and execution time. For some examples the workload may be containerized to allow execution of distributed workload across multiple resources. Containerization of the workload may provide separation and security of the primary users' data. Containerization is an alternative to full machine virtualization that involves encapsulating a workload in a container with its own operating environment. Containers may be designed to run on various platforms. Containerization of the workload may provide similar benefits to executing the workload on a virtual machine. This may address issues of data structure changes to meet data store demands. Workload containerization may also allow data locking to protect the primary users' data from unauthorized access.

At operation 206, the workload capacity for each computing system and the workload execution cost may be reported to each of the computing systems of the network. The workload capacity for each computing system and the workload execution cost information may be used to schedule workload executions. For example, based on the workload capacity for each computing system and the workload execution cost, workloads may be requested, rejected or transferred. For some examples of the present disclosure, the workload capacity for each computing system and the workload execution cost information may be broadcasted to each of the other computing systems of the network. For some examples of the present disclosure, the workload capacity for each computing system and the workload execution cost information may be reported to a centralized workload management service for workload execution scheduling.

At operation 208, a neural path through the network may be generated. The neural path may meet the determined workload execution cost to execute the workload container. A neural path may be generated based on available information that allows execution of a workload across multiple computing systems.

At operation 210, the neural path may be dynamically updated based upon changes to the workload capacity of one or more of the computing systems. Initially, there may be some rejection of workload, but over time the neural network model learns how the computing resources of the network interact and may generate more accurate neural paths for workload execution.

The neural path may be revised upon iterations of the process and updated information. For example, a workload capacity of computing device may change over time and the generated neural path may no longer meet the determined workload execution cost or may not be as efficient as another neural path. As the neural network learns from iterations of the process, the generated neural path may be dynamically updated to meet the determined workload execution cost.

FIG. 3 illustrates an example network of computing systems to implement artificial intelligence-based distributed workload execution according to some examples of the present disclosure. The computing network 300, shown in FIG. 3, includes computing systems 305a-305d. The computing systems 305a-305d are communicatively coupled to each other by way of a network 310 (e.g., the Internet, an intranet, etc.). According to examples of the present disclosure, a network may have any number of computing systems and the computing systems may be communicatively coupled to each other in various ways. According to examples of the disclosure, computing systems may include or may be, for example, a personal computer, a desktop computer, a mobile computer, a laptop computer, a notebook computer, a terminal, a workstation, a server computer, a network device, or any other suitable computing device.

As shown in FIG. 3, each of the computing systems 305a-305d may include computing component 320. Computing component 320 may include a controller/CPU 325 that may be, for example, a CPU, a chip or any suitable computing or computational device. Computing component 320 may include an operating system 330, a memory 340, executable code 345, and a storage system 350 that may include input/output devices 355.

Controller/CPU 325 may be configured to carry out methods described herein and/or to execute various modules. Each of the computing systems 305a-305d may include more than one computing component 320, and one or more computing components 320 may act as the components of a computing system according to examples of the present disclosure.

Operating system 330 may be, or may include, any code designed and/or configured to perform tasks involving controlling or otherwise managing operation of computing component 320. This may include scheduling execution of software programs or enabling software programs or other modules or units to communicate. As an example, operating system 330 may be a commercial operating system. For some examples of the disclosure, the computing component 320 may include a computing device that does not use an operating system (e.g., a microcontroller, ASIC, FPGA, or SOC).

Memory 340 may be implemented in various forms including random access memory (RAM), read-only memory (ROM), volatile or non-volatile memory, a cache memory, or other suitable memory units or storage units. Memory 340 may be a computer-readable non-transitory storage medium.

Executable code 345 may be any executable code, e.g., an application, a program, or a process. Executable code 345 may be executed by controller/CPU 325 possibly under control of operating system 330. Examples of the present disclosure may include a plurality of executable code that may be loaded into memory 340 and cause controller/CPU 325 to carry out methods described herein.

Storage system 350 may be or may include, for example, a hard disk drive, flash memory, a micro controller-embedded memory, or removable storage. Content may be stored in storage system 350 and may be loaded from storage system 350 into memory 340 where it may be processed by controller/CPU 325. Although shown as a separate component, storage system 350 may be embedded or included in memory 340.

Input/output devices 355 may include any suitable input devices such as a keyboard/keypad, mouse and any suitable output devices such as displays or monitors. A universal serial bus (USB) device or external hard drive may be included in input/output devices 355. Any applicable input/output devices may be connected to computing component 320 by, for example, a wired or wireless network interface.

As discussed above, examples of the present disclosure may include a computer-readable medium, which when executed by a processor may cause the processor to perform operations disclosed herein. According to examples of the present disclosure, executable code 345 includes executable code implementing an AI workload capacity module 346 and a workload execution management module 347 that may provide a neural network model for executing workload across computer systems.

According to examples of the disclosure, the workload capacity module 346 on each computing system may continuously monitor system utilization. For example, the workload capacity module 346 may analyze CPU utilization, RAM utilization, disk I/O speed, instruction execution speed, and floating-point operation speed of the computing system. The workload capacity module 346 may create a system utilization report and send the system utilization report to the other computing systems 305a-305d of the network 300 (FIG. 3). The system utilization report may be synchronized for every computing system so that inconsistencies may be corrected. Therefore, at any time, all of the computing systems know the availability of computing resources for all computing systems of the network.

According to an example of the disclosure, the workload execution management module 347 on each computing system determines a workload execution cost for each workload. The workload execution cost for a specified workload may be determined by simulating a workload. The simulation may be based on the available computing resources of a computing system to determine the workload execution time for each computing system. The workload execution cost for a specified workload may also be determined by executing the workload and analyzing system performance metrics and workload execution time.

Using the computing resources availability information, the workload execution management module 347 may predict which computing system (or set of computing systems) has the available computing resources to provide workload capacity to execute the workload. The workload execution management module 347 may then generate a neural path through the computing systems that meets the predicted execution cost of the workload.

According to examples of the disclosure, the neural path may be dynamically updated based on changes to computing resources availability throughout the network. For example, if a computing system that has been assigned a workload becomes unavailable, the computing system may reject the workload and may report unavailability to all of the other computing systems of the network. Other computing systems that have available resources that meet the workload execution cost may accept the workload.

For some examples of the present disclosure the workload execution management module 347 may generate multiple neural paths that meet systems that meet the predicted execution cost of the workload. As discussed above, the neural paths may be determined based on real-time performance measurements and may be disrupted, for example if a device is unexpectedly unavailable. In some examples, one or more contingency neural paths may be generated in case of an interruption in execution capacity of the neural path.

This may allow a contingency neural path to be used to execute a workload upon a disruption of primary neural path.

As discussed above, for some examples of the present disclosure, the workload capacity for each computing system and the workload execution cost information as well as other information to implement the neural network workload execution model may be reported to each of the other computing systems of the network.

For such examples, a host computing system may review an open transaction record and select a workload for execution based upon a workload capacity of the computing system. If no other computing system of the network is executing the workload, the host computing system may notify the other computing systems of the network that the workload is being executed. Upon completion of execution, the host computing may notify the other computing systems of the network. If workload completion fails (e.g., the workload execution is interrupted), the host computing system may suspend the workload execution and queue the workload execution internally for execution at a later time or request that the workload execution be transferred to another computing system of the network.

For some examples of the present disclosure, the workload capacity for each computing system 305a-305d and the workload execution cost information may be reported to a centralized workload management service for workload execution scheduling.

Workload execution requests may be sent to a centralized workload management service. The centralized workload management service may manage all the workload execution requests. Workload execution requests may be queued and then sent to a host computing system 305a having a workload capacity that meets the workload execution cost of the workload execution request.

When the host computing system 305a has received a workload execution request, the host computing system 305a may send an acknowledgement to the centralized workload management service and begin execution of the workload. Upon completion of execution of the workload, the host computing system 305a may report completion to the centralized workload management service. If workload completion fails (e.g., the workload execution is interrupted), the host computing system 305a may notify the centralized workload management service that the workload cannot be executed at that time by the host computing system 305a. The centralized workload management service may then transfer the workload to a different computing system 305b-d of the network 300 according to examples of the present disclosure. If no computing systems are available to execute the workload, the centralized workload management service may queue the workload request until host computing resources are available to provide workload capacity that meets the workload execution cost of the workload execution request.

Figure 4:
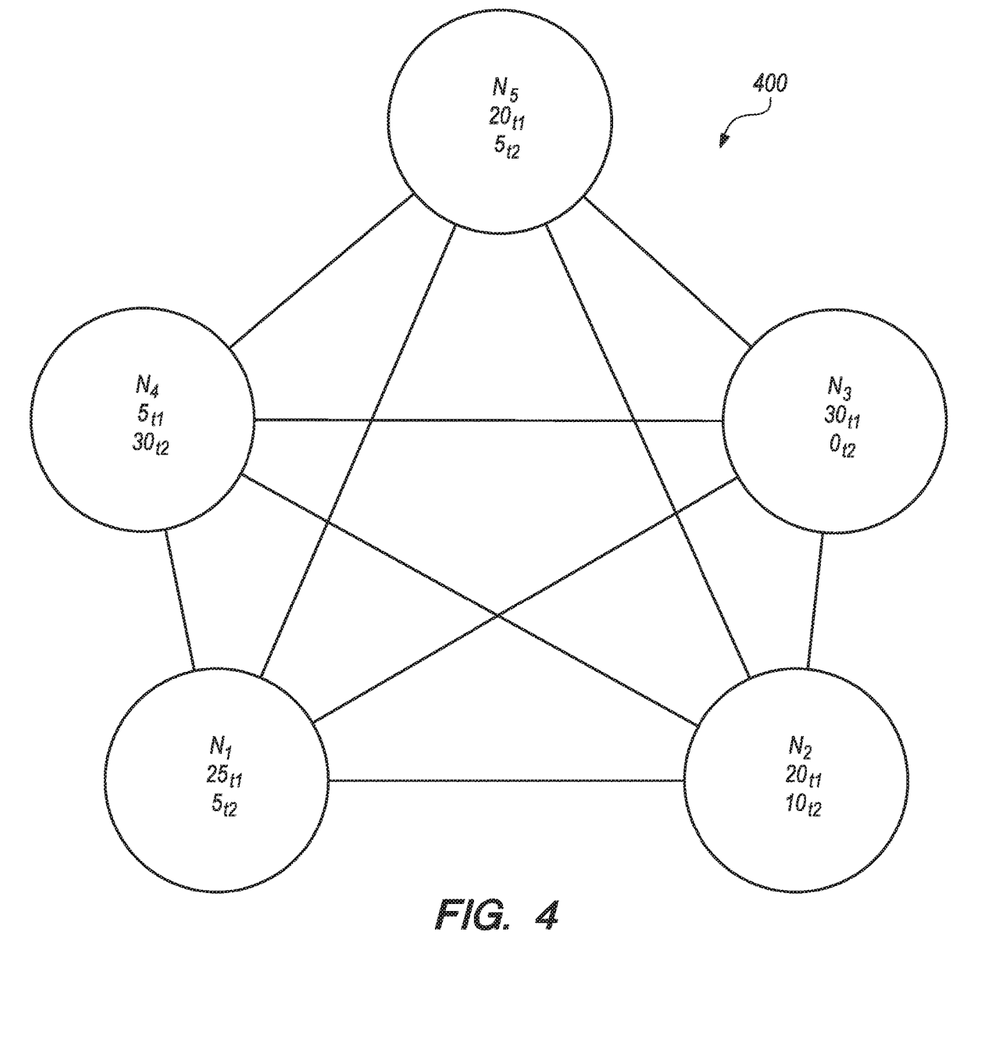
FIG. 4 illustrates a nodal network of computing resources according to an example of the present disclosure.

FIG. 4 illustrates a nodal network of computing resources 400 according to an example of the present disclosure. Nodal network 400 as shown in FIG. 4 includes nodes $N_1$-$N_5$. The term 'node' is used herein to refer to a computer system used for processing and routing transactions within a network of nodes. Nodes may include, for example, an individual computer, a server in an organization, or a data center operated by an organization.

In general, a nodal network of computing resources according to examples of the present disclosure may have any number of nodes, $N_1$-$N_n$, and the number of nodes may change at any time as nodes may be added or removed to reflect computing resources added to or removed from the network.

The neural network model may calculate workload capacity of the computing resources of the network in MIPS (millions of instructions per second). The neural network model may calculate workload capacity of the computing resources of the network at various times as shown for example in FIG. 4 as times $t_1$ and $t_2$. The values for workload capacity of FIG. 4 may represent a pattern of resource availability learned by a neural network model based on iterations over a period of time.

As shown in FIG. 4 at time $t_1$ which may be, for example, during a particular time period of a day or a particular day of the week, node $N_1$ has a capacity of 25 MIPS. Node $N_2$ has a capacity of 20 MIPS, node $N_3$ has a capacity of 30 MIPS, node $N_4$ has a capacity of 5 MIPS, and node $N_5$ has a capacity of 20 MIPS. At time, $t_1$, the network may be able to execute a workload total of 100 MIPS.

At time $t_1$, for example, for a workload having a total workload execution cost of 30 MIPS, the neural path may include node $N_3$ as the workload can be executed by node $N_3$ without sharing. If node $N_3$ is not available as predicted or subsequently is disrupted, the neural path may be dynamically updated to include node $N_2$ and node $N_5$, or the neural path may include other nodes having a combined total workload capacity of 30 MIPS or greater.

At time $t_1$, for example, for a workload having a total workload execution cost of 75 MIPS, the neural path may include node $N_1$, node $N_3$, and node $N_4$. If node $N_1$ is not available as predicted or subsequently is disrupted, the neural path may be dynamically updated to include node $N_2$, node $N_3$, node $N_4$, and node $N_5$ to meet the total workload execution cost of 75 MIPS.

As shown in FIG. 4 at time, $t_2$ which may be, for example, during a different time period of a day or a different day of the week than $t_1$, node $N_1$ has a capacity of 5 MIPS, node $N_2$ has a capacity of 10 MIPS, node $N_3$ has a capacity of 0 MIPS, node $N_4$ has a capacity of 30 MIPS, and node $N_5$ has a capacity of 5 MIPS. Therefore, at time $t_2$, the network may be able to execute a workload total of 50 MIPS.

As illustrated, nodes may have different workload capacities at different times as, for example, different time periods of a day or different days of the week. So, for example, at time $t_2$, node $N_3$ has a capacity of 0 which may indicate that the computing system has been removed from the network or that a host user is using the entire workload capacity of the computing system at time $t_2$. Neural paths generated at time $t_2$ may not include node $N_3$.

Examples of the present disclosure may provide increased accuracy of workload execution predictions, and containerization of the workloads may provide separation and security of the primary user's data. Examples of the present disclosure may allow efficient scheduling and use of resources without adversely impacting the primary user.

Examples of the present disclosure may include a method to execute workload using computing systems of a network of computing systems. For example, a real-time performance of each computing system may be analyzed to determine a workload capacity of each computing system. A workload execution cost to execute a workload container may be determined. The workload capacity for each computing system and the workload execution cost may be reported to each of the computing systems. A neural path through the network that meets the determined workload execution cost to execute the workload container may then be generated. The neural path may be dynamically updated based upon changes to the workload capacity of one or more of the computing systems.

Examples of the present disclosure may include a network of computing systems. Each of the computing systems of the network may have a workload capacity module and a workload execution management module. The workload capacity module may analyze a real-time performance of the computing system. The workload execution management module may determine a workload execution cost to execute a workload container and to generate a neural path through the network. The neural path may meet the predetermined workload execution cost to execute the workload container.

The various component computing systems as shown in FIG. 3 and FIG. 4 are illustrative and are not intended to limit the scope of the present invention. The computing systems and/or nodes may instead each include multiple interacting computing systems or devices, and the computing systems/nodes may be connected to other devices including through one or more networks such as the Internet, via the Web, or via private networks. More generally, a computing system or node may comprise any combination of hardware that may interact with and perform the described types of functionality, optionally when programmed or otherwise configured with particular software instructions and/or data structures including without limitation desktop or other computers, database servers, network storage devices and other network devices. In addition, the functionality provided by the workload execution system as shown may in some examples be distributed in various modules. Similarly, in some examples, some of the functionality of the workload execution system may not be provided and/or other additional functionality may be provided.

Furthermore, in some examples, some or all of the systems and/or modules may be implemented or provided in other manners such as by those consisting of one or more means that are implemented at least partially in firmware and/or hardware rather than as a means implemented in whole or in part by software instructions that configure a particular processor. The systems, modules, and data structures may also in some examples be transmitted via generated data signals on a variety of computer-readable transmission mediums, including wireless-based mediums and may take a variety of forms. Accordingly, examples of the present disclosure may be practiced with other computer system configurations.

While the above description is a complete description of specific examples of the disclosure, additional examples are also possible. Thus, the above description should not be taken as limiting the scope of the disclosure which is defined by the appended claims along with their full scope of equivalents.

The invention claimed is:

1. A computer-readable storage medium including a random access memory (RAM), an electrically-erasable programmable read-only memory (EEPROM), storage drive, or disc having stored thereon instructions which when executed by a processor of a computing device, cause the processor to execute operations comprising:
propagating a neural network model onto a computing network having a plurality of computing resources, wherein the neural network model generates a neural path through the computing network to computing resources providing a workload capacity meeting a workload execution cost associated with executing a workload container, and wherein the workload execution cost is an estimation of computing resources used to execute the workload container or a time for executing the workload container;
sending a report of a respective workload capacity and workload execution cost for each of the plurality of computing resources, wherein the respective workload capacity is based on real-time performance metrics and historical usage patterns of a corresponding computing resource, and wherein the neural path is updated based on changes to the workload capacity of any of the computing resources of the neural path; and
executing the workload container using computing resources of the updated neural path.

2. The computer-readable storage medium of claim 1, wherein the instructions cause the processor to perform a further operation comprising:
executing the workload container using computing resources of a contingency neural path of the neural network model upon an interruption or disruption of the neural path.

3. The computer-readable storage medium of claim 1, wherein the real-time performance metrics include CPU utilization, RAM utilization, disk I/O speed, instruction execution speed, network bandwidth and floating-point operation speed.

4. The computer-readable storage medium of claim 1, wherein the instructions cause the processor to perform a further operation comprising:
storing the neural network model on the computing device.

5. The computer-readable storage medium of claim 1, wherein the workload execution cost is the time for executing the workload container and wherein the time is a duration of at least one of a simulated workload container execution and an actual workload container execution.

6. The computer-readable storage medium of claim 1, wherein the instructions cause the processor to perform a further operation comprising:
reporting the execution of the workload container to each of the plurality of computing resources.

7. The computer-readable storage medium of claim 1, wherein the instructions cause the processor to perform a further operation comprising:
requesting, rejecting, or transferring the workload container based on the workload capacity and the workload execution cost for each computing resource.

8. A method executed by a computing device comprising:
propagating a neural network model onto a computing network having a plurality of computing resources, wherein the neural network model generates a neural path through the computing network to computing resources providing a workload capacity meeting a workload execution cost associated with executing a workload container, and wherein the workload execution cost is an estimation of computing resources used to execute the workload container or a time for executing the workload container;
sending a report of a respective workload capacity and workload execution cost for each of the plurality of computing resources, wherein the respective workload capacity is based on real-time performance metrics and historical usage patterns of a corresponding computing resource, and wherein the neural path is updated based on changes to the workload capacity of any of the computing resources of the neural path; and
executing the workload container using computing resources of the updated neural path.

9. The method of claim 8, wherein the real-time performance metrics include CPU utilization, RAM utilization, disk I/O speed, instruction execution speed, network bandwidth and floating-point operation speed.

10. The method of claim 8, further comprising:
executing the workload container using computing resources of a contingency neural path of the neural network model upon an interruption or disruption of the neural path.

11. The method of claim 8, wherein the workload execution cost is the time for executing the workload container and wherein the time is a duration of at least one of a simulated workload container execution and an actual workload container execution.

12. The method of claim 8, further comprising:
reporting the execution of the workload container to each of the plurality of computing resources.

13. The method of claim 8, further comprising:
storing the neural network model on the computing device.

14. The method of claim 8, further comprising:
requesting, rejecting, or transferring the workload container based on the workload capacity and the workload execution cost for each computing resource.

15. A computing device comprising:
a processor; and
a hardware computer-readable storage medium having stored thereon instructions which when executed by the processor, cause the processor to execute operations comprising:
propagating a neural network model onto a computing network having a plurality of computing resources, wherein the neural network model generates a neural path through the computing network to computing resources providing a workload capacity meeting a workload execution cost associated with executing a workload container, and wherein the workload execution cost is an estimation of computing resources used to execute the workload container or a time for executing the workload container;
sending a report of a respective workload capacity and workload execution cost for each of the plurality of computing resources, wherein the respective workload capacity is based on real-time performance metrics and historical usage patterns of a corresponding computing resource, and wherein the neural path is updated based on changes to the workload capacity of any of the computing resources of the neural path; and
executing the workload container using computing resources of the updated neural path.

16. The computing device of claim 15, wherein the real-time performance metrics include CPU utilization, RAM utilization, disk I/O speed, instruction execution speed, network bandwidth and floating-point operation speed.

17. The computing device of claim 15, wherein the instructions cause the processor to perform a further operation comprising:
executing the workload container using computing resources of a contingency neural path of the neural network model upon an interruption or disruption of the neural path.

18. The computing device of claim 17, wherein the instructions cause the processor to perform a further operation comprising:
storing the neural network model on the computing device.

19. The computing device of claim 15, wherein the workload execution cost is the time for executing the workload container and wherein the time is a duration of at least one of a simulated workload container execution and an actual workload container execution.

20. The computing device of claim 15, wherein the instructions cause the processor to perform a further operation comprising:
reporting the execution of the workload container to each of the plurality of computing resources.

* * * * *